United States Patent
McCroskey et al.

(10) Patent No.: US 8,963,093 B2
(45) Date of Patent: Feb. 24, 2015

(54) TOMOGRAPHIC IMAGING METHODS AND SYSTEMS FOR DIGITAL WAVE FRONT DECIMATION IN TIME SAMPLING

(75) Inventors: William K. McCroskey, Solon, OH (US); Timothy W. Milliff, Montville, OH (US); Christ H Heipp, Mantua, OH (US)

(73) Assignee: FMI Technologies, Inc., Akron, OH (US)

( * ) Notice: Subject to any disclaimer, the term of this patent is extended or adjusted under 35 U.S.C. 154(b) by 758 days.

(21) Appl. No.: 13/269,604

(22) Filed: Oct. 9, 2011

(65) Prior Publication Data

US 2012/0085911 A1 Apr. 12, 2012

Related U.S. Application Data

(60) Provisional application No. 61/391,622, filed on Oct. 9, 2010.

(51) Int. Cl.
*G01T 1/202* (2006.01)
*G01T 1/164* (2006.01)
*G01T 1/20* (2006.01)

(52) U.S. Cl.
CPC .............. *G01T 1/1647* (2013.01); *G01T 1/2018* (2013.01)
USPC .......................................... 250/362; 250/366

(58) Field of Classification Search
CPC ....................................................... G01T 1/202
USPC ...................................................... 250/362, 366
See application file for complete search history.

(56) References Cited

U.S. PATENT DOCUMENTS

| | | | |
|---|---|---|---|
| 5,825,033 A * | 10/1998 | Barrett et al. | 250/370.1 |
| 6,362,479 B1 | 3/2002 | Andreaco et al. | |
| 7,304,309 B2 | 12/2007 | Suhami | |
| 7,635,848 B2 | 12/2009 | Nelson | |
| 7,723,694 B2 | 5/2010 | Frach et al. | |
| 2007/0131858 A1 | 6/2007 | Wollenweber et al. | |
| 2009/0314947 A1 | 12/2009 | Goushcha et al. | |
| 2009/0324042 A1 | 12/2009 | Laurence et al. | |
| 2010/0172565 A1 | 7/2010 | Degenhardt et al. | |
| 2010/0219347 A1 | 9/2010 | Schulz et al. | |
| 2010/0246919 A1* | 9/2010 | Wainer | 382/131 |

FOREIGN PATENT DOCUMENTS

| | | |
|---|---|---|
| WO | 2006111883 | 10/2006 |
| WO | 2009019659 | 2/2009 |
| WO | WO 2009024895 A2 * | 2/2009 |

* cited by examiner

*Primary Examiner* — David Porta
*Assistant Examiner* — Faye Boosalis
(74) *Attorney, Agent, or Firm* — Dominic A. Frisina (57) ABSTRACT

Some embodiments can comprise a tomographic imaging data acquisition method(s) and/or systems embodying the method(s). Some methods according to embodiments of the invention include simultaneously reading each photoconverter of a scintillation detector; reading the photoconverters at a frequency sufficient to obtain a plurality of digital sample measurements of a scintillation wave front; and recording the data read from each of the plurality of photoconverters as a function of time.

20 Claims, 5 Drawing Sheets

TOMOGRAPHIC IMAGING METHODS AND SYSTEMS FOR DIGITAL WAVE FRONT DECIMATION IN TIME SAMPLING

I. CROSS REFERENCE TO RELATED APPLICATIONS

This invention claims priority to U.S. Provisional Patent Application No. 61/391,622 filed Oct. 9, 2010 and now pending, and which is incorporated by reference in its entirety.

II. BACKGROUND OF THE INVENTION

A. Field of Invention

This invention generally relates to systems and methods for data acquisition and processing in positron emission tomography (PET), and/or single photon emission computed tomography (SPECT).

B. Description of the Related Art

PET and SPECT imaging devices operate by sensing gamma radiation emitted by radiopharmaceuticals that have accumulated in target organs or tissues of a patient. A two or three dimensional image is constructed by mapping the positions of particular gamma sources. With specific reference to a PET experiment, a selected radiopharmaceutical is administered to a patient, which can comprise any of a wide variety of physiologically relevant molecules. The suitability of a radiopharmaceutical depends, in part, upon the organ or tissue to be imaged. One particularly common choice is fluorodeoxyglucose (FDG), which is a molecule of glucose where a hydroxyl group is substituted with $^{18}F$. $^{18}F$ is a $\beta^+$ emitter meaning that it undergoes the following nuclear decay reaction:

$$^{18}F \rightarrow {}^{18}O + \beta^+ + v + e- \qquad \text{eq. 1}$$

where $\beta^+$ is a positron, v is a neutrino, and e– is an electron. The positron is ejected from the nucleus of $^{18}F$ with substantial kinetic energy, which must be almost entirely dissipated before the positron can combine with an electron in an annihilation event. In general, dissipative processes can be elastic or inelastic scattering with any surrounding matter in the path of the positron, including electrons and nuclei. Statistically, positrons travel about 1 mm before losing enough kinetic energy to combine with an electron and annihilate. When annihilation occurs, a pair of 511 keV gamma photons is created equaling the energy equivalent of the annihilated particles, and radiating at close to 180° from each other. In the ideal case where the positron and electron both have zero momentum at the time of annihilation, the gamma photons would emit at exactly 180°. Deviation from 180° by about +/−0.5° indicates that the annihilation event occurred with particles having residual momentum.

It is known to place a pair of PET detectors 180° from each other to detect a pair of gamma photons emitted from a single annihilation event, and calculate the position of the annihilation event from the data collected. In some cases, the two or more PET detectors are rotated around the patient, and in others PET detectors form a continuous ring about the patient, thus requiring no rotation. In either case, the respective detectors collect gamma photons and either accept or reject the data depending in part on whether the photon was within an acceptable range about 511 keV, and whether it arrived within an acceptable time window to correlate one gamma photon to another. When a match is found between gamma photons, i.e. they are determined to have originated from the same annihilation event, a line of response (LOR) can be drawn between the two points on the respective detectors where the photons were detected. Accordingly, the position of the annihilation event must be located somewhere along the LOR.

Some instruments are capable of sufficient temporal resolution to calculate the position of the annihilation event based on the difference in the time of flight (TOF) of the pair of gamma photons. In lower resolution instruments other mathematical methods must be used to calculate annihilation position based on interpolation and/or extrapolation algorithms.

Traditionally PET/SPECT detectors include a plurality of scintillation crystals arranged in a pixelated two-dimensional array and spaced apart with septum material, which limits optical interference between adjacent crystals. The array of scintillation crystals is placed in optical communication with a plurality of photoconverters also arranged in a two-dimensional array. Often, one photoconverter will be in optical communication with a plurality of scintillation crystals. When a scintillation crystal receives a gamma photon, the photon travels some finite distance within the crystal before finally being absorbed. This distance, is known as the depth of interaction (DOI). At the position where the gamma photon is absorbed, the crystal emits a large number of UV and/or visible photons, i.e. it scintillates. The photon wave front propagates within the crystal and contacts the photoconverters. Traditionally, the photoconverters continuously integrate the photonic signal and are read individually based on whether they reach a minimum threshold signal intensity, and the data may be digitized thereafter. A center-of-mass calculation is then used to estimate the position of the scintillation event. From this data, parameters can be calculated for image reconstruction. For example, known image reconstruction algorithms can then be applied to the data to create an image. Such image reconstruction algorithms can include Filtered Back Projection and/or Ordered Subset Expectation Maximization. The reconstructed image can then be displayed according to known image display algorithms such as maximum intensity projection (MIP) and/or minimum intensity projection (mIP).

What is needed is a system and/or method for digitally sampling a scintillation wave front in real time, which would enable much higher temporal resolution in measuring the scintillation wave front, and thus higher resolution image reconstruction. Some embodiments of the present invention overcome one or more limitations of the prior art.

III. SUMMARY OF THE INVENTION

Some embodiments of the present invention relate to a tomographic imaging data acquisition method, comprising the steps of: simultaneously reading each photoconverter of a scintillation detector; reading the photoconverters at a frequency sufficient to obtain a plurality of digital sample measurements of a scintillation wave front; and recording the data read from each of the plurality of photoconverters as a function of time.

According to some embodiments the scintillation detector comprises a PET detector, a SPECT detector, or a PET/SPECT detector.

According to some embodiments the scintillation detector comprises one or more of a single slab scintillation crystal, a single slab scintillation crystal having pixelation grooves disposed on a face of the crystal, or a pixelated array of scintillation crystals.

According to some embodiments the frequency of simultaneously reading each of the plurality of photoconverters is from about 250 MHz to about 10 GHz.

Some embodiments further comprise computing the position of a scintillation event using a time difference center-of-mass calculation method.

Some embodiments relate to a tomographic imaging data acquisition system, comprising: at least one scintillation crystal having a photon-receiving face and a photon detection face substantially parallel to the receiving face and spaced apart therefrom to define a thickness; a plurality of photoconverters in optical communication with the photon detection face of the at least one scintillation crystal, wherein the photoconverters define a two-dimensional array of abutting photoconverters; and a controller in electronic communication with the plurality of photoconverters, wherein the controller is adapted to read each of the photoconverters simultaneously, and wherein the controller is adapted to obtain a decimation in time series of data of a photon wave front in real time.

According to some embodiments the system comprises a temporal resolution from about 100 to 1 ps.

According to some embodiments the temporal resolution is selected from one or more of about 100 to 50 ps, about 50 to 40 ps, about 40 to 30 ps, about 30 to 20 ps, about 20 to 10 ps, or about 10 to 1 ps.

According to some embodiments the scintillation crystal comprises a material selected from one or more of cerium doped lutetium yttrium orthosilicate (LYSO), sodium doped cesium iodide (Na:CsI), bismuth germinate (BGO), cerium doped gadolinium orthosilicate (GSO), thallium doped sodium iodide (Tl:NaI), barium fluoride (BaF2), cerium doped yttrium aluminate (YAlO3, i.e. YAP), cerium doped lutetium oxyorthosilicate (Ce:Lu2SiO5, i.e. LSO), lanthanum bromide (LaBr3), cerium doped lanthanum bromide, or any combination thereof.

According to some embodiments the plurality of photoconverters comprise one or more of a silicon photomultiplier, an avalanche photodiode, or any combination thereof.

According to some embodiments the system is adapted to calculate x-y annihilation position to a precision of about 1 to 2 mm.

According to some embodiments the system is adapted to calculate gamma photon TOF to a precision of about 40 ps.

According to some embodiments the system is adapted to measure scintillation pulse time to a precision of about 40 ps.

According to some embodiments the system is adapted to calculate scintillation depth of interaction to a precision of about 1 to 3 mm.

According to some embodiments the system comprises an energy resolution of about 2 to 10%.

Some embodiments relate to a tomographic imaging data processing method, comprising the steps of: simultaneously reading each photoconverter of a PET and/or SPECT scintillation detector; reading the photoconverters at a frequency sufficient to obtain a plurality of digital sample measurements of a scintillation wave front; recording the data read from each of the plurality of photoconverters as a function of time; and computing the position of a scintillation event using a time difference center-of-mass calculation method.

According to some embodiments the frequency of simultaneously reading each of the plurality of photoconverters is from about 250 MHz to about 10 GHz.

According to some embodiments the frequency of simultaneously reading each of the plurality of photoconverters defines a range selected from one or more of 250 to 300 MHz, 300 to 350 MHz, 350 to 400 MHz, 400 to 450 MHz, 450 to 500 MHz, 500 to 550 MHz, 550 to 600 MHz, 600 to 650 MHZ, 650 to 700 MHz, 700 to 750 MHz, 750 to 800 MHz, 800 to 850 MHz, 850 to 900 MHz, 900 to 950 MHz, 950 to 1000 MHz, 1000 MHz to 1050 MHz, 1050 to 1100 MHz, 1100 MHz to 1150 MHz, 1150 to 1200 MHz, 1200 to 1250 MHz, 1250 to 1300 MHz, 1350 to 1400 MHz, 1400 to 1450 MHz, 1450 to 1500 MHz, 1500 to 1550 MHz, 1550 to 1600 MHz, 1600 to 1650 MHz, 1650 to 1700 MHz, 1700 to 1750 MHz, 1750 to 1800 MHz, 1800 to 1850 MHz, 1850 to 1900 MHz, or 1900 to 1950 MHz.

According to some embodiments the data defines a temporal resolution up to about 4 picoseconds.

Some embodiments further comprise the step of communicating the data to a pulse wave front digital processor and calculating from the pulse data one or more of pulse energy, pulse time, scintillation event position, annihilation x-y position, gamma photon time-of-flight, or gamma photon depth-of-interaction with the scintillation crystal.

Other benefits and advantages will become apparent to those skilled in the art to which it pertains upon reading and understanding of the following detailed specification.

IV. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

V. DETAILED DESCRIPTION OF THE INVENTION

According to some embodiments, a PET/SPECT tomographic imaging system comprises either a single continuous slab scintillation crystal or a pixelated array of scintillation crystals. A face of the crystal, or array of crystals, is in optical communication with a plurality of high-speed photoconverters, which are adapted to synchronously detect scintillation events in the crystal(s). Suitable photoconverters can include, without limitation, a silicon photomultiplier (SiPM) array, or an array of avalanche photodiodes.

Particularly, the plurality of photoconverters is adapted to synchronously obtain a time series of digital samples of a wave front in real time, the time series comprising a decimation in time sampling. According to some embodiments of the invention, one or more algorithms are applied to the digital pulse data, which can enhance temporal resolution up to about 4 picoseconds. Subsequently, one or more other algorithms are then applied to the resulting high temporal resolution data using a Pulse Wave Front digital processor to achieve high precision calculations of pulse energy, pulse time, scintillation event position, annihilation x-y position, gamma photon time-of-flight (TOF), and gamma photon depth-of-interaction (DOI) with the scintillation crystal.

Some embodiments optionally include a continuous digital pulse pileup correction algorithm for deconvoluting temporally overlapping event signals.

According to some embodiments suitable scintillation crystals can comprise one or more of cerium doped lutetium yttrium orthosilicate (LYSO), sodium doped cesium iodide (Na:CsI), bismuth germinate (BGO), cerium doped gadolinium orthosilicate (GSO), thallium doped sodium iodide (Tl:NaI), barium fluoride ($BaF_2$), cerium doped yttrium aluminate ($YAlO_3$, i.e. YAP), cerium doped lutetium oxyorthosilicate ($Ce:Lu_2SiO_5$, i.e. LSO), lanthanum bromide ($LaBr_3$), cerium doped lanthanum bromide, or any combination thereof.

Some embodiments include scintillation crystals having a reflective coating, or a reflective member, on one or more surfaces of a scintillation crystal to prevent loss of scintillation photons. Furthermore, in some embodiments every surface, except that which is in optical communication with one or more photoconverters, includes a reflective coating or member. Numerous suitable transparent reflective coatings are known in the art. Typical reflective members can include polytetrafluoroethylene (PTFE) tape or any of a wide variety of diffuse reflector materials.

Figure 1A:
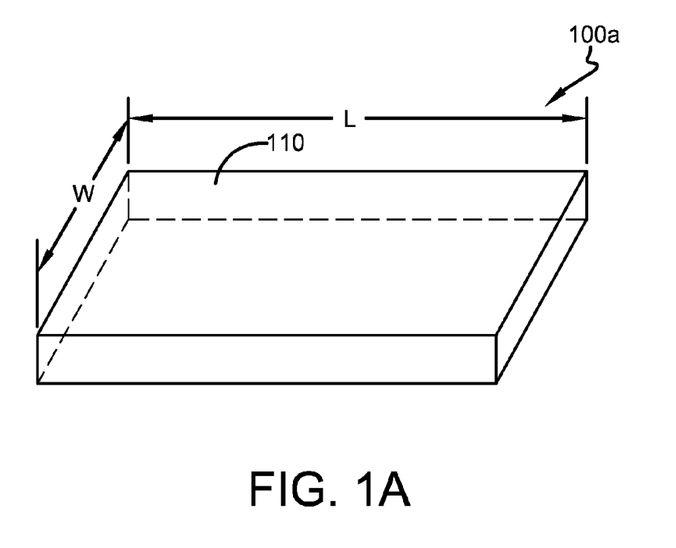
FIG. 1A is a perspective view of a slab scintillation crystal of an embodiment.
Figure 1B:
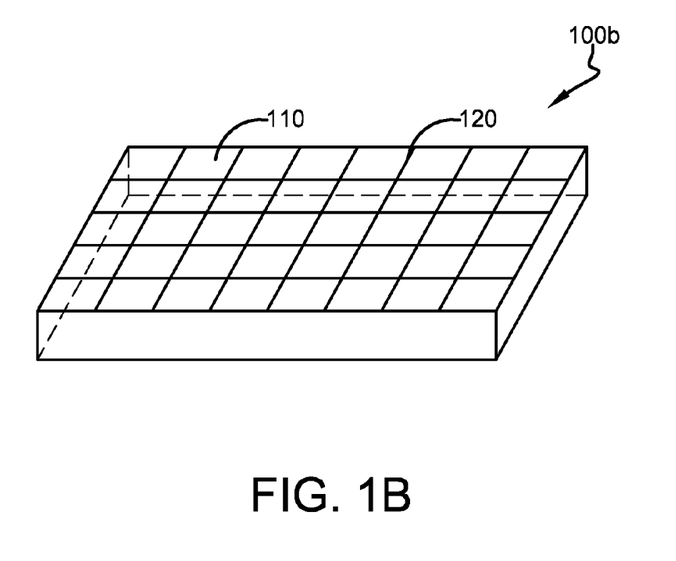
FIG. 1B is a perspective view of a slab scintillation crystal of an embodiment including pixelation grooves.
Figure 2A:
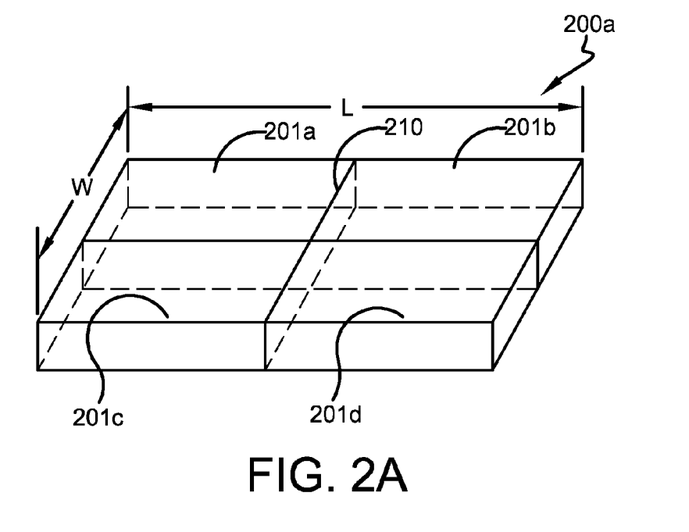
FIG. 2A is a perspective view of a plurality of joined scintillation crystals of an embodiment.

Suitable scintillation detectors can take a variety of forms. For example, in some embodiments a suitable detector can comprise a single slab of a scintillation crystal 100a as shown in FIG. 1A. In some embodiments, the slab can have no pixelation grooves, or it can include one or more pixelation grooves 120 disposed on one or more faces 110 of the crystal 100b. Some embodiments can even include pixelated arrays of discrete scintillation crystals optically separated by septa. With specific regard to single-slab scintillation crystals, some crystals may not be available as a single crystal in large enough sizes for a slab detector. Thus, some embodiments 200 can comprise a plurality of scintillation crystals 201a, 201b, 201c, and 201d joined using an index-matching material 210 that matches the index of refraction of the crystals being joined 201a-d thereby limiting or eliminating interfacial reflections, i.e. Fresnel reflections. Suitable index-matching materials can include any of a variety of optical adhesives known in the art, which are characterized by indices of refraction similar to that of the scintillation crystal. One of skill in the art will recognize that the proper choice of index-matching material will depend on the specific scintillation crystal selected for use in the detector.

Figure 2B:
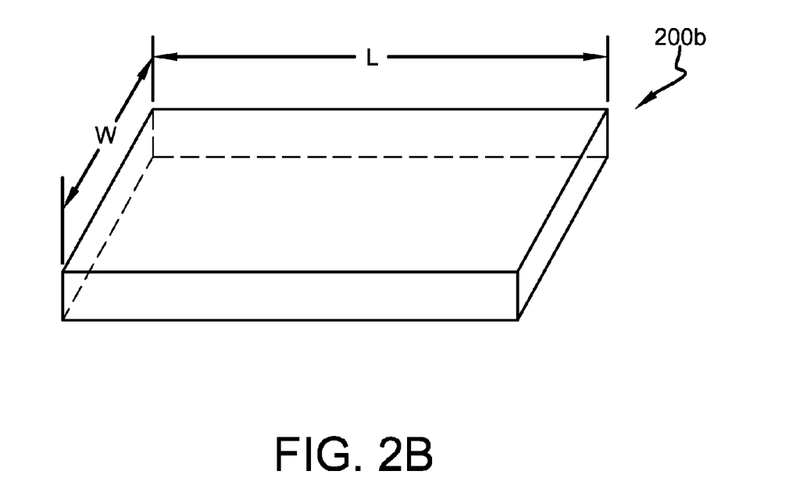
FIG. 2B is a perspective view of a slab scintillation crystal of an embodiment.

For example, according to some embodiments a scintillation detector can comprise a single slab of LYSO crystal 200b, while other embodiments 200a can comprise a plurality of smaller LYSO crystals 201a-d, wherein each is a rectangular subunit joined together using an index matching material 210. Thus, the plurality of joined LYSO crystals 200a can have similar overall dimensions to that of the single slab LYSO crystal 200b. Furthermore, in some embodiments each of the plurality of joined LYSO crystals 101a-d can comprise an area of about one quarter that of an overall area of the plurality of joined crystals 200a.

Figure 3:
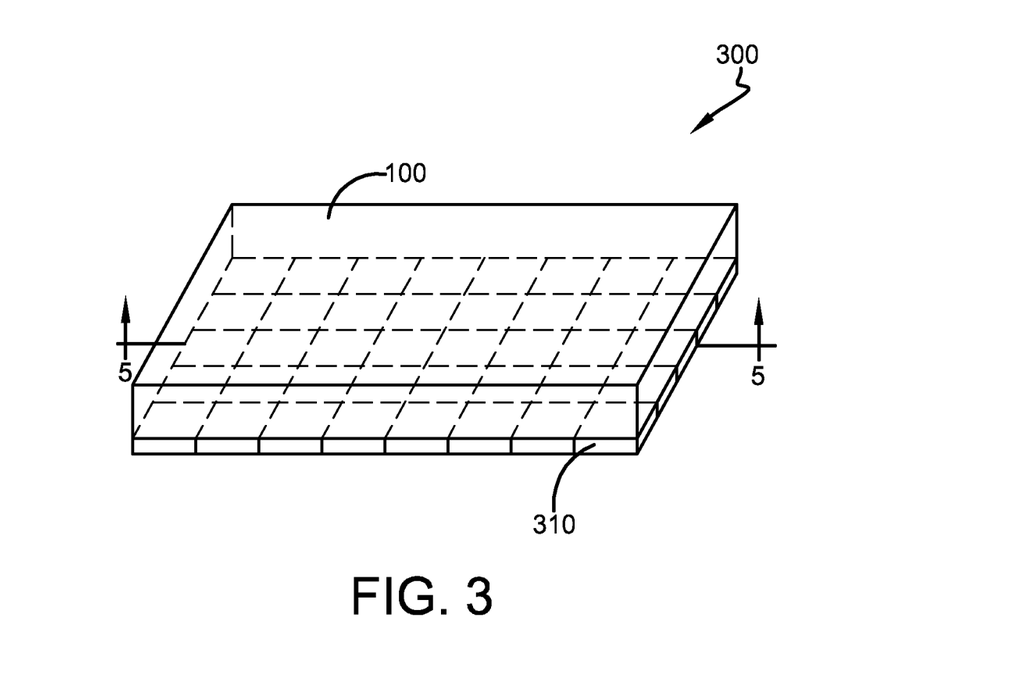
FIG. 3 is a perspective view of a PET/SPECT detector of an embodiment.
Figure 4:
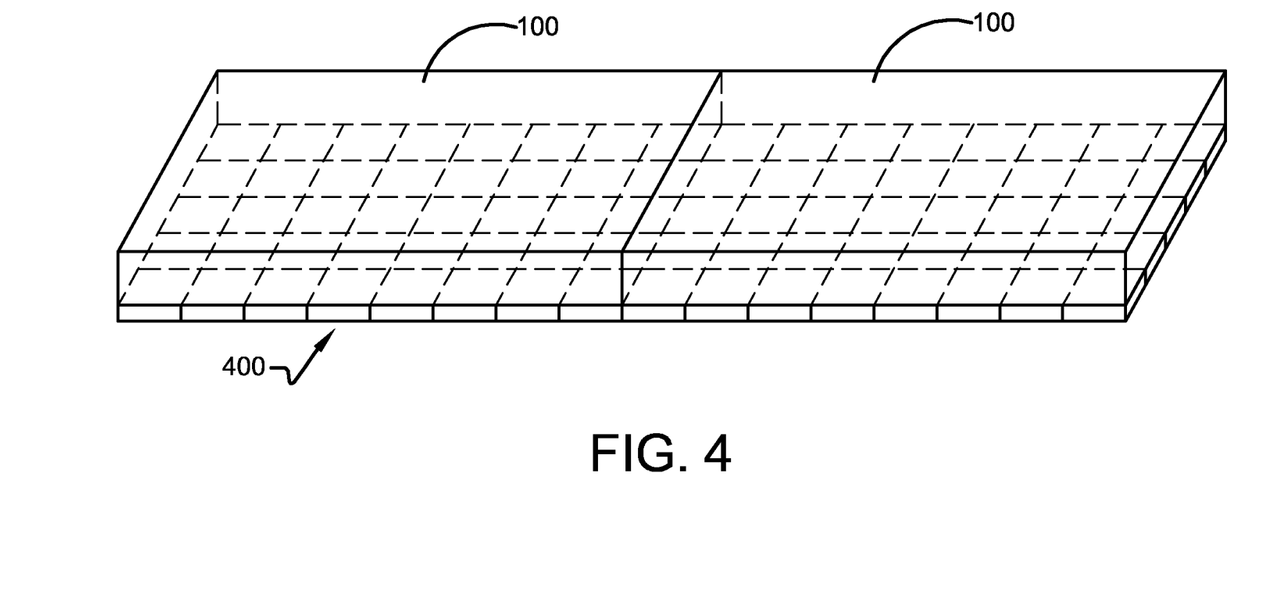
FIG. 4 is a perspective view of a pair of edge-abutting PET/SPECT detectors.

As shown in FIG. 3, according to some embodiments a scintillation detector 300 can comprise a single scintillation crystal 100, wherein a major surface of the crystal 100 is in optical communication with a plurality of photoconverters 310 arranged in a two dimensional array. Suitable photoconverters can include, without limitation, silicon photomultipliers and/or avalanche photodiodes. As discussed above, the single crystal 100 can alternatively comprise a plurality of joined crystals such as 200a of FIG. 2A and/or can include pixelation grooves such as that of 100b of FIG. 1B. FIG. 4 illustrates that detectors 300 of some embodiments can be juxtaposed with one another forming an edge-abutted pair 400 of detectors 300. In such embodiments, the scintillation crystal slabs 100, 100' are separated by an air interface 420.

Figure 5A:
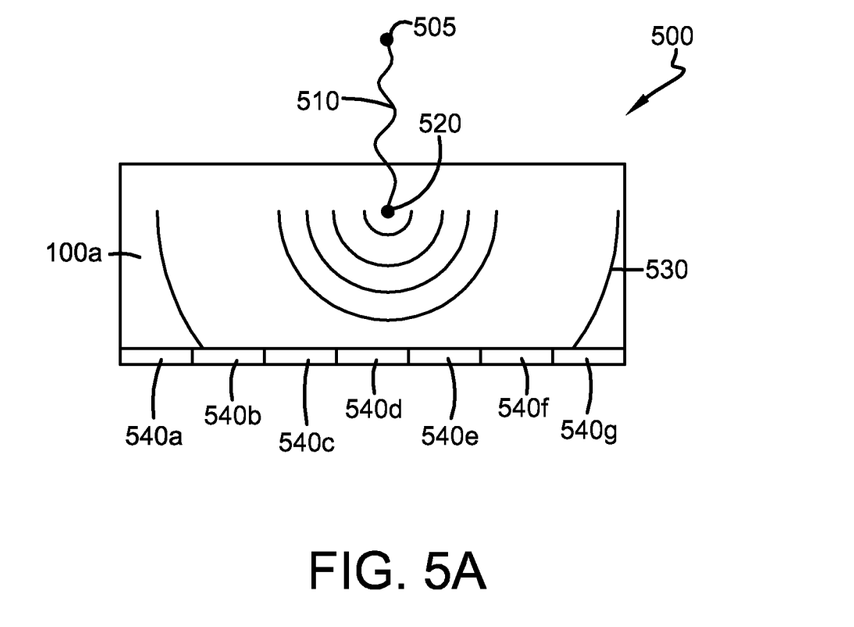
FIG. 5A is a cross sectional view of the detector of FIG. 3.
Figure 5B:
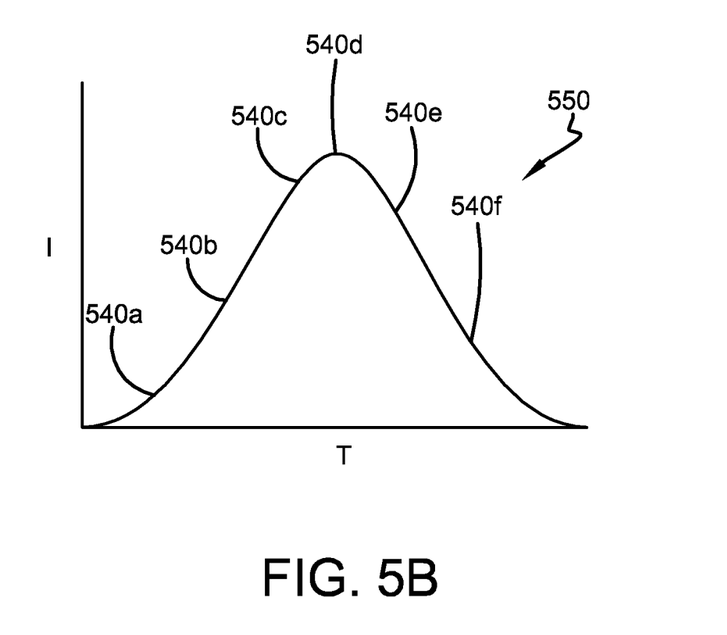
FIG. 5B is a graph of a signal resulting from wave front detection.

Turning to FIG. 5A, a cross sectional view of the detector of FIG. 3 is shown during detection of a scintillation event. According to some embodiments, a 511 keV gamma photon 505 resulting from $\beta^+$ decay enters the scintillation crystal 100a and travels 510 to a depth where it interacts with, i.e. is absorbed by, the scintillation crystal 100a. Subsequently, the scintillation crystal relaxes and emits a plurality of visible spectrum photons defining a scintillation event 520. The photon wave front 530 propagates through the scintillation crystal 100a and is characterized by a light pulse duration of about 10 to 100 nanoseconds, or as in the case of LYSO, about 40 nanoseconds. The wave front 530 reaches the photoconverters 540a-g, which are polled simultaneously to obtain a first digital sample measurement of the wave front 530. The photoconverters 540a-g are then simultaneously polled repeatedly to obtain a time series of digital samples 560a-f of the wave front 530 defining an electronic signal pulse 550. One of skill in the art will recognize that while only a one-dimensional array of photoconverters 540a-f is shown, the entire two-dimensional array is engaged in measurement of the wave front 530. Detection is discussed in terms of a one-dimensional array only to facilitate illustration.

With continuing reference to FIG. 5A, simultaneously polling each photoconverter enables a more accurate calculation of the position of the scintillation event and DOI. While it is known to use a center of mass calculation to determine this position according to intensity differences between photoconverters, simultaneous polling additionally enables detection of the time difference between the time of arrival of the wave front at one photoconverter 550a versus another 550b. Accordingly, some embodiments include a time difference center-of-mass calculation for determining the position of scintillation events.

According to some embodiments, each photoconverter element of a detector is read simultaneously at a rate of about 250 MHz to about 10 GHz. Other suitable ranges can include, without limitation, from about 250 to 300 MHz, 300 to 350 MHz, 350 to 400 MHz, 400 to 450 MHz, 450 to 500 MHz, 500 to 550 MHz, 550 to 600 MHz, 600 to 650 MHZ, 650 to 700 MHz, 700 to 750 MHz, 750 to 800 MHz, 800 to 850 MHz, 850 to 900 MHz, 900 to 950 MHz, 950 to 1000 MHz, 1000 MHz to 1050 MHz, 1050 to 1100 MHz, 1100 MHz to 1150 MHz, 1150 to 1200 MHz, 1200 to 1250 MHz, 1250 to 1300 MHz, 1350 to 1400 MHz, 1400 to 1450 MHz, 1450 to 1500 MHz, 1500 to 1550 MHz, 1550 to 1600 MHz, 1600 to 1650 MHz, 1650 to 1700 MHz, 1700 to 1750 MHz, 1750 to 1800 MHz, 1800 to 1850 MHz, 1850 to 1900 MHz, or 1900 to 1950 MHz. Here as elsewhere in the specification and claims, ranges may be combined.

Although the foregoing description is that of a single scintillation event, one of skill in the art will recognize that in actual operation a plurality of scintillation events can occur close enough in time so that either their wave fronts overlap, or the temporal resolution of the detector is exceeded, resulting in pulse pile-up and/or tail pile-up. Furthermore, pulse pile-up can result in contaminated data sets including, for instance, incorrect measurements of pulse energy. Accordingly, some embodiments further comprise methods for correcting, mitigating, and/or eliminating pulse pile-up. For example, some embodiments can include algorithms for deconvoluting overlapping pulses, detecting and rejecting overlapping pulses, or other suitable correction methods.

According to some embodiments, one or more cross correlation, interpolation, and/or super resolution algorithms can be applied to the pulse data 550 to increase the temporal resolution by about fifty-fold resulting in a temporal resolution of up to about 4 ps. More particularly, some embodiments are characterized by temporal resolutions from about 100 to 50 ps, about 50 to 40 ps, about 40 to 30 ps, about 30 to 20 ps, about 20 to 10 ps, or about 10 to 1 ps. Such high temporal resolution enables the high precision calculation of parameters including, without limitation, x-y annihilation position, gamma photon time-of-flight (TOF), gamma photon depth of interaction (DOI), scintillation event position, pulse energy, and/or pulse time or any combination thereof. Particularly, some representative ranges of precision obtainable according to embodiments of the invention are included in Table 1.

TABLE 1

| Parameter | Precision |
|---|---|
| x-y annihilation position | up to +/− 1 or 2 mm |
| gamma photon TOF | up to +/− 40 ps |
| scintillation pulse time | up to +/− 40 ps |
| scintillation DOI | up to +/− 1 to 3 mm |
| Energy Resolution | up to +/− 2 to 10% |

The embodiments have been described, hereinabove and shown in the various drawing views, which are included for purposes of illustrating embodiments of the invention and not for limiting the same. Thus, it will be apparent to those skilled in the art that the above methods and apparatuses may incorporate changes and modifications without departing from the general scope of this invention. Accordingly, it is intended to include all such modifications and alterations insofar as they come within the scope of the appended claims or the equivalents thereof.

Having thus described the invention, it is now claimed:

1. A tomographic imaging data acquisition method, comprising the steps of:
    simultaneously reading each photoconverter of a scintillation detector;
    reading the photoconverters at a frequency sufficient to obtain a plurality of digital sample measurements of a scintillation wave front; and
    recording the data read from each of the plurality of photoconverters as a function of time.

2. The method of claim 1, wherein the scintillation detector comprises a PET detector, a SPECT detector, or a PET/SPECT detector.

3. The method of claim 2, wherein the scintillation detector comprises one or more of a single slab scintillation crystal, a single slab scintillation crystal having pixelation grooves disposed on a face of the crystal, or a pixelated array of scintillation crystals.

4. The method of claim 1, wherein the frequency of simultaneously reading each of the plurality of photoconverters is from about 250 MHz to about 10 GHz.

5. The method of claim 1, further comprising computing the position of a scintillation event using a time difference center-of-mass calculation method.

6. A tomographic imaging data acquisition system, comprising:
    at least one scintillation crystal having a photon-receiving face and a photon detection face substantially parallel to the receiving face and spaced apart therefrom to define a thickness;
    a plurality of photoconverters in optical communication with the photon detection face of the at least one scintillation crystal, wherein the photoconverters define a two-dimensional array of abutting photoconverters; and
    a controller in electronic communication with the plurality of photoconverters, wherein the controller is adapted to read each of the photoconverters simultaneously, and wherein the controller is adapted to obtain a decimation in time series of data of a photon wave front in real time.

7. The system of claim 6, wherein the system comprises a temporal resolution from about 100 to 1 ps.

8. The system of claim 7, wherein the temporal resolution is selected from one or more of about 100 to 50 ps, about 50 to 40 ps, about 40 to 30 ps, about 30 to 20 ps, about 20 to 10 ps, or about 10 to 1 ps.

9. The system of claim 6, wherein the scintillation crystal comprises a material selected from one or more of cerium doped lutetium yttrium orthosilicate (LYSO), sodium doped cesium iodide (Na:CsI), bismuth germinate (BGO), cerium doped gadolinium orthosilicate (GSO), thallium doped sodium iodide (TI:NaI), barium fluoride (BaF2), cerium doped yttrium aluminate (YAIO3, i.e. YAP), cerium doped lutetium oxyorthosilicate (Ce:Lu2Si05, i.e. LSO), lanthanum bromide (LaBr3), cerium doped lanthanum bromide, or any combination thereof.

10. The system of claim 6, wherein the plurality of photoconverters comprise one or more of a silicon photomultiplier, an avalanche photodiode, or any combination thereof.

11. The system of claim 6, wherein the system is adapted to calculate x-y annihilation position to a precision of about 1 to 2 mm.

12. The system of claim 6, wherein the system is adapted to calculate gamma photon TOF to a precision of about 40 ps.

13. The system of claim 6, wherein the system is adapted to measure scintillation pulse time to a precision of about 40 ps.

14. The system of claim 6, wherein the system is adapted to calculate scintillation depth of interaction to a precision of about 1 to 3 mm.

15. The system of claim 6, wherein the system comprises an energy resolution of about 2 to 10%.

16. A tomographic imaging data processing method, comprising the steps of:
    simultaneously reading each photoconverter of a PET and/or SPECT scintillation detector;
    reading the photoconverters at a frequency sufficient to obtain a plurality of digital sample measurements of a scintillation wave front;
    recording the data read from each of the plurality of photoconverters as a function of time; and
    computing the position of a scintillation event using a time difference center-of-mass calculation method.

17. The method of claim 16, wherein the frequency of simultaneously reading each of the plurality of photoconverters is from about 250 MHz to about 10 GHz.

18. The method of claim 16, wherein the frequency of simultaneously reading each of the plurality of photoconverters defines a range selected from one or more of 250 to 300 MHz, 300 to 350 MHz, 350 to 400 MHz, 400 to 450 MHz, 450 to 500 MHz, 500 to 550 MHz, 550 to 600 MHz, 600 to 650 MHZ, 650 to 700 MHz, 700 to 750 MHz, 750 to 800 MHz, 800 to 850 MHz, 850 to 900 MHz, 900 to 950 MHz, 950 to 1000 MHz, 1000 MHz to 1050 MHz, 1050 to 1100 MHz, 1100 MHz to 1150 MHz, 1150 to 1200 MHz, 1200 to 1250 MHz, 1250 to 1300 MHz, 1350 to 1400 MHz, 1400 to 1450 MHz, 1450 to 1500 MHz, 1500 to 1550 MHz, 1550 to 1600 MHz, 1600 to 1650 MHz, 1650 to 1700 MHz, 1700 to 1750 MHz, 1750 to 1800 MHz, 1800 to 1850 MHz, 1850 to 1900 MHz, or 1900 to 1950 MHz.

19. The method of claim 16, wherein the data defines a temporal resolution up to about 4 picoseconds.

20. The method of claim 16 further comprising the step of communicating the data to a pulse wave front digital processor and calculating from the pulse data one or more of pulse energy, pulse time, scintillation event position, annihilation x-y position, gamma photon time-of-flight, or gamma photon depth-of-interaction with the scintillation crystal.

* * * * *